Sept. 8, 1936.  G. AMERY  2,053,311
FUEL AND LIKE PUMP FOR INTERNAL COMBUSTION ENGINES
Filed June 6, 1935  5 Sheets-Sheet 2
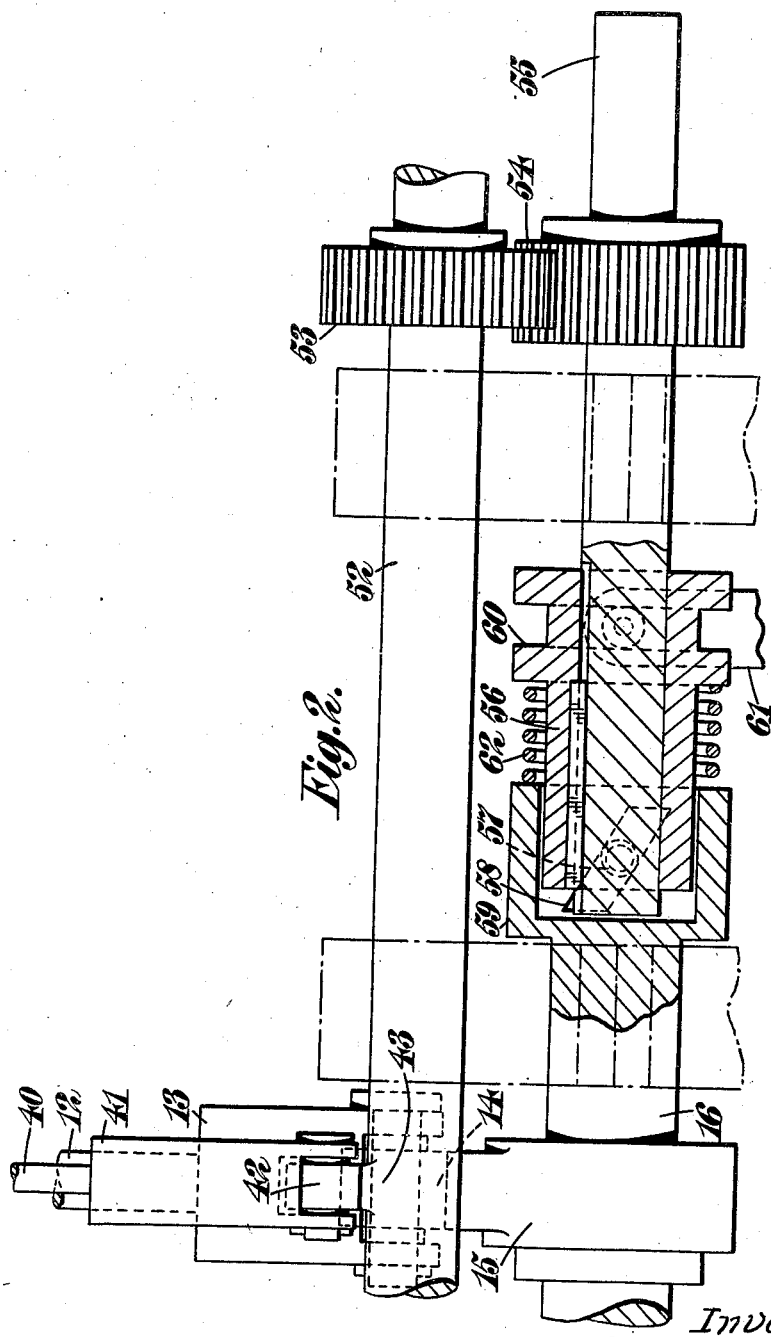
Inventor:
George Amery,
By Byrnes, Stebbins & Blenko,
attys.

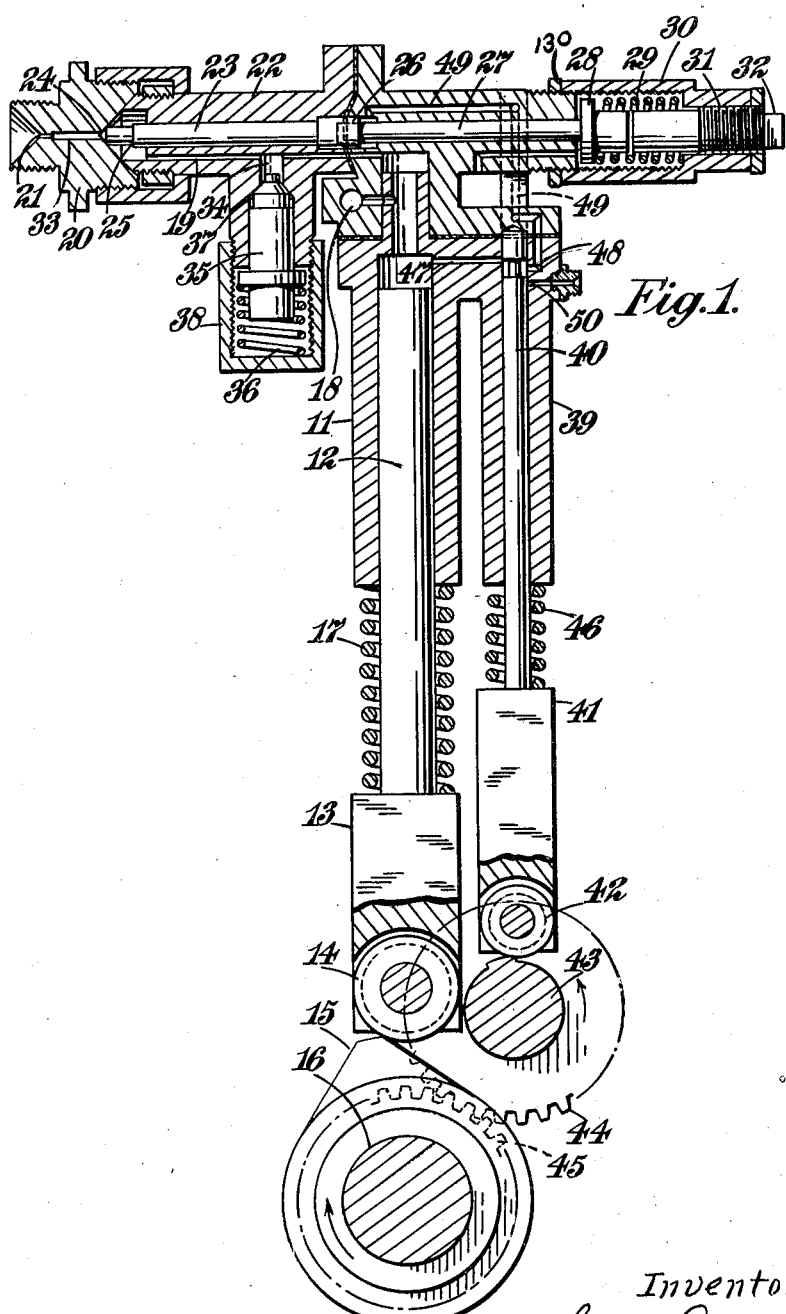

Sept. 8, 1936.    G. AMERY    2,053,311
FUEL AND LIKE PUMP FOR INTERNAL COMBUSTION ENGINES
Filed June 6, 1935    5 Sheets-Sheet 3
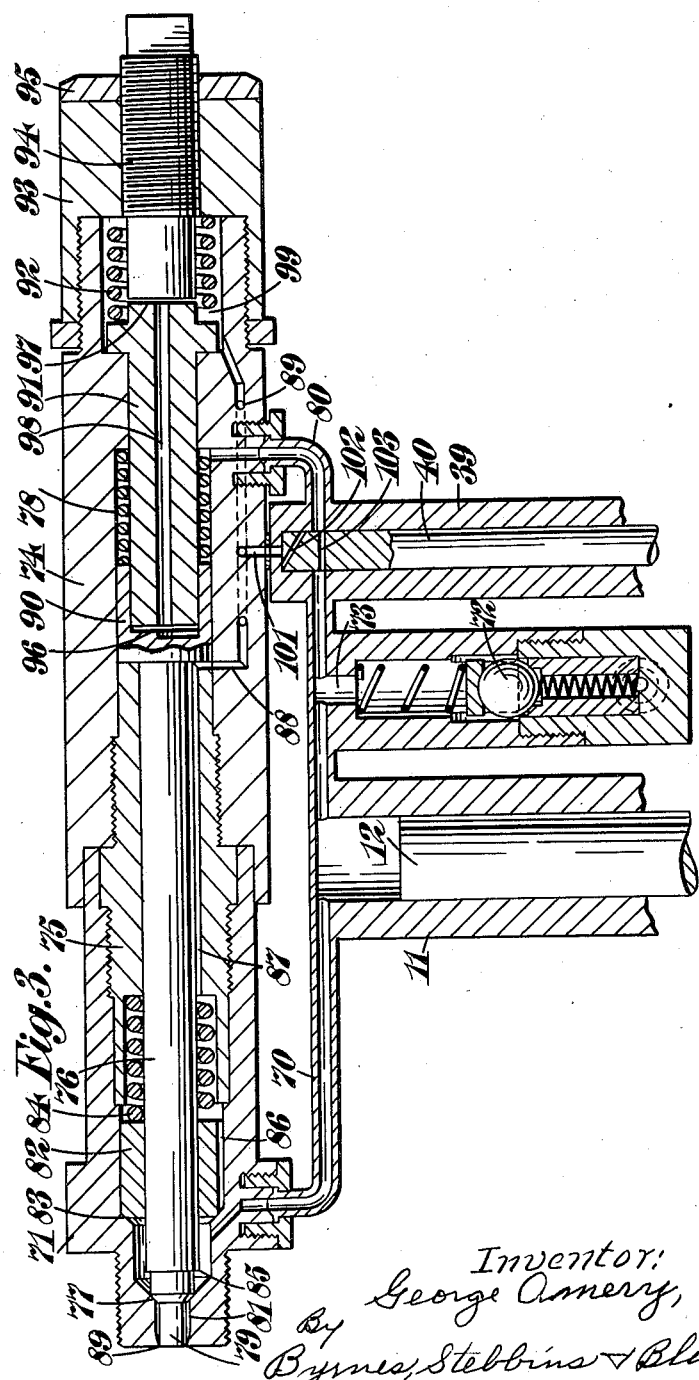
Inventor:
George Amery,
By Byrnes, Stebbins & Blenko,
attys.

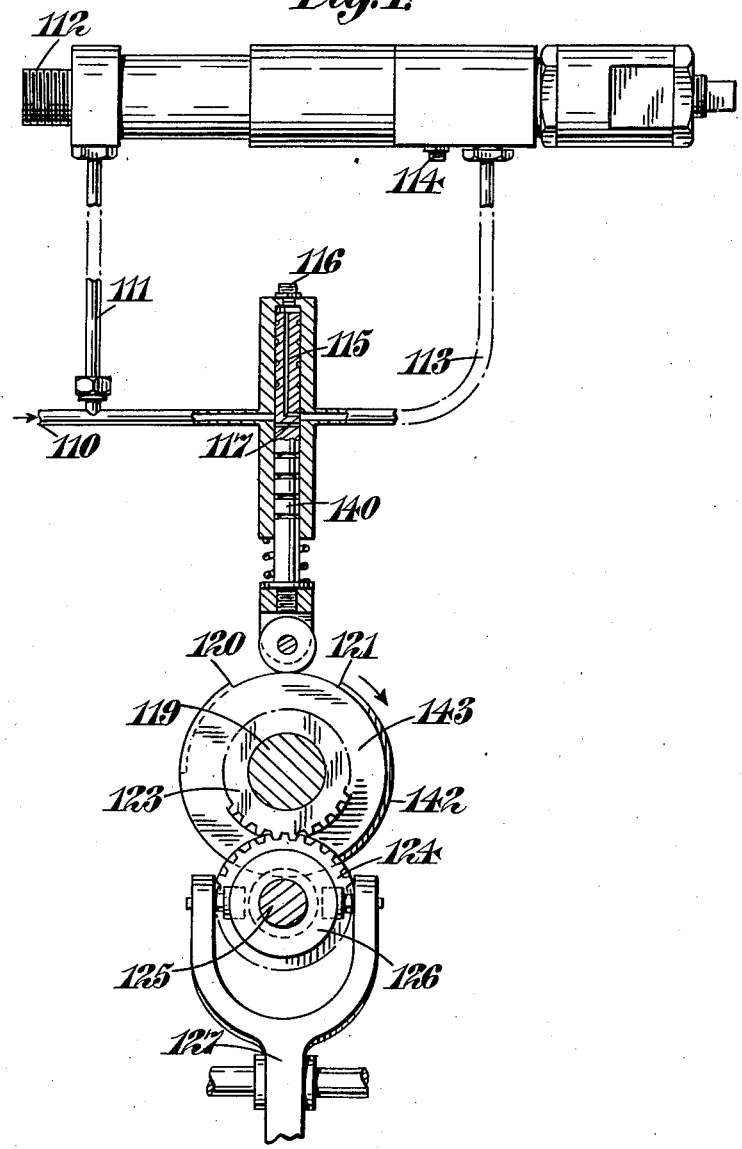

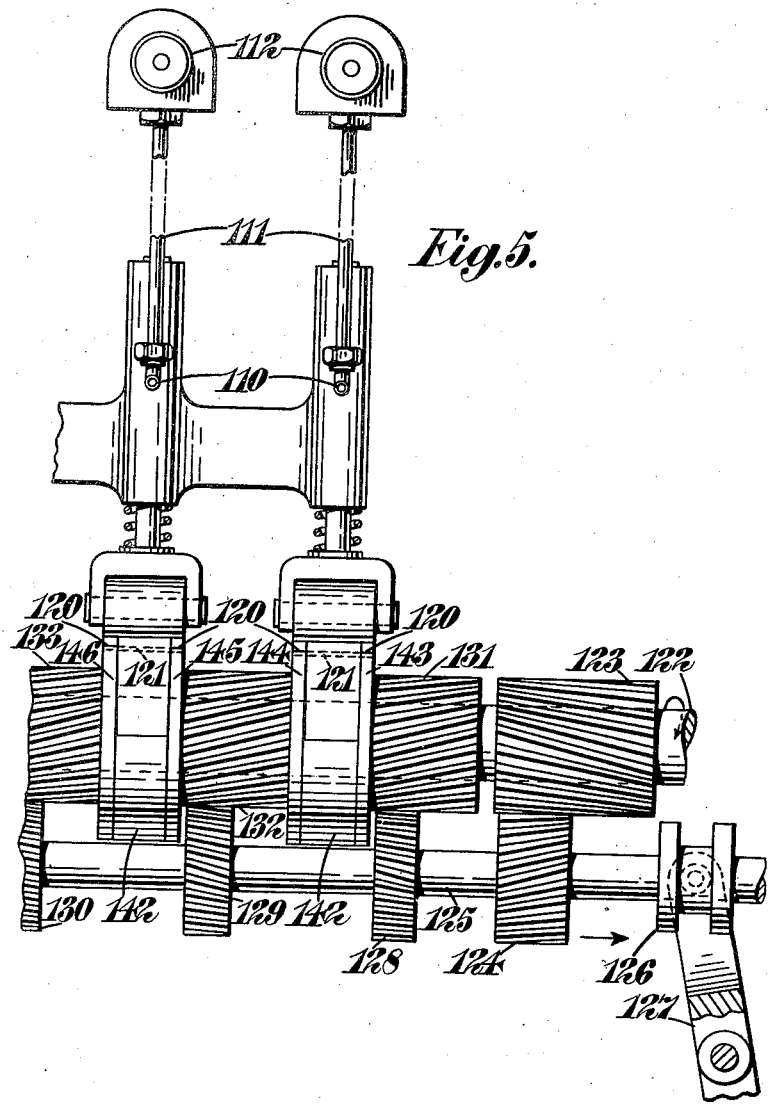

Patented Sept. 8, 1936

2,053,311

UNITED STATES PATENT OFFICE 2,053,311

FUEL AND LIKE PUMP FOR INTERNAL COMBUSTION ENGINES

George Amery, Kilburn, London, England

Application June 6, 1935, Serial No. 25,341
In Great Britain June 13, 1934

9 Claims. (Cl. 299—107.2)

This invention comprises improvements in or relating to fuel and like pumps for internal-combustion engines and has for its object to provide a pump suitable for the delivering of small quantities of liquid against high pressure such as is necessary in the case of a fuel pump for an internal-combustion engine.

It has previously been proposed that an internal-combustion engine should have a fuel injection system comprising a plunger pump connected by conduits to an injection nozzle and to close the injection nozzle by a spring-pressed needle-valve, but in the ordinary construction the pump has an automatic or a mechanically-actuated outlet valve interposed between itself and the fuel passage communicating with the injection nozzle, which outlet valve serves to hold up pressure in the injection nozzle when the pump-plunger is retracted, and so the pressure in the pump-barrel does not at all times correspond with the pressure of the nozzle.

According to the present invention there is provided a fuel injection system for an internal-combustion engine the combination of a fuel-nozzle, a spring-closed needle-valve therein, an oil-pressure pump for delivering oil at injection pressure, a permanently-open connection between the oil-pressure pump and the fuel-nozzle and piston means upon the needle-valve responsive to oil pressure for determining the opening and closing of the same.

According to this invention the opening and closing of the needle-valve by the said piston means may be effected either by the fluctuations of pressure in the pump-barrel or by variations of the admission of the pressure to the piston means under the control of a mechanically-actuated valve and both forms of construction are hereinafter described.

The present invention comprises in a fuel injection system for an internal-combustion engine the combination of a fuel-nozzle, a spring-closed needle-valve for the nozzle, means whereby oil pressure applied to the nozzle acts also to lift the needle-valve from its seating, a pump-barrel, a plunger, means for actuating the plunger, and a permanently open connection between the pump-barrel and the nozzle so that the pressure at the needle-valve rises and falls at all times with the pressure in the pump-barrel. The means whereby the oil pressure applied to the nozzle acts also to lift the needle-valve from its seating may comprise a piston on the needle-valve, which piston, owing to the fact that the needle-valve is spring-closed, will be a yieldingly supported piston. Consequently, by increasing the spring pressure on the piston the degree of valve opening will be reduced and the oil delivery decreased while by reducing the spring pressure on the piston the oil delivery will be increased, although the displacement of the plunger may have been left unaltered. The pressure against which the oil must be delivered is also regulated by the strength of the spring.

Preferably, also means are provided to close the needle-valve against its seating in combination with mechanically-actuated means for determining when the oil pressure is applied to close the same. Thus, the invention comprises in a fuel injection system for an internal-combustion engine the combination of a fuel-nozzle, a spring-closed needle-valve for the nozzle, a pump-barrel, a pump-plunger therein, means for actuating the plunger, a direct connection between the pump-barrel and the nozzle and mechanically-actuated means for controlling the opening and closing of the fuel-nozzle by means of the oil-pressure in the pump-barrel.

In one construction according to the present invention the needle-valve is provided with an opening piston, a closing piston and with oil-pressure connections from the pump-barrel to act on both pistons and wherein the mechanically-actuated means for controlling the opening and closing of the needle-valve comprises a cam-actuated valve to determine the distribution of the oil pressure to at least one of the said oil connections.

Preferably the needle-valve is opened by the oil pressure applied to the nozzle so that the commencement of injection depends upon the timing of the pump-plunger and its termination on oil pressure applied to a closing piston under the control of the said mechanically-actuated valve. The mechanically-actuated valve may be operatively connected to the means for actuating the fuel-plunger by a mechanism which permits of advancing or retarding the time at which it closes the fuel-nozzle.

The following is a description, by way of example, of certain constructional embodiments of the invention with reference to the accompanying drawings, in which:—

Figure 1 is a vertical section through a fuel pump and nozzle;

Figure 2 shows the driving mechanism of the same;

Figure 3 illustrates a modified construction;

Figure 4 represents a further modification, and

Figure 5 shows the driving mechanism of the modification illustrated in Figure 4.

Referring to Figure 1 a pump-barrel 11 contains a plunger 12 having a head 13 outside the barrel which carries a cam roller 14 actuated by a cam 15 on a shaft 16. The plunger 12 is returned against the action of the cam by a spring 17. It will be appreciated that the drawings are diagrammatic in the sense that well known constructional precautions such as the provision of packing rings or sealing grooves around the plunger are not illustrated. The pump-barrel communicates through a passage 18 with an inlet valve which may be, for example, a spring-closed ball valve of the pattern commonly employed for liquid pumps of small capacity. In addition the plunger is in communication through a permanently open passage 19 with a fuel-nozzle. The fuel-nozzle comprises a nozzle proper 20 having an injection orifice 21 and a body portion 22 which forms a guide for a needle-valve 23. The needle-valve has a conical seating 24 for closing the back of the nozzle aperture, it has an enlargement or shoulder 25 hereinafter referred to and a closing piston 26 at the back of the body 22. Moreover, the stem of the needle-valve 23 is prolonged at 27 and carries outside the back of the body of the fuel-nozzle a head 28 on which bears a closing spring 29 located in a screwed cap 30. By screwing the cap backwards or forwards upon the body of the fuel-nozzle the degree of compression imparted to the spring 29 can be varied. The cap may be locked by a lock-nut 130. The cap 30 furthermore contains a screwed stop 31 having a square 32 on its head for adjustment purposes and adapted to be set so as to limit the degree of opening of the needle-valve 23. Returning to the seating end of the needle-valve, it will be observed that owing to the action of the stop 31 only a very small lift of the seating 24 from the back of the nozzle 20 is permitted. Between this seating and the fine nozzle-orifice 21 there is a relatively enlarged cylindrical passage 33.

From one side of the permanently open passage 19 between the pump-barrel 11 and the fuel-nozzle there is a branch passage 34 which contains a fuel-pressure relief valve 35 held down by a spring 36 on a seating 37 by means of an internally screwed and adjustable cap 38.

At one side of the pump-barrel 11 there is a guide 39 for a piston-valve 40, the stem of which carries a head 41 having a roller 42 to engage on a cam 43. The cam 43 is driven by a gear wheel 44 from another gear wheel 45 on the shaft 16 as hereinafter described, the operative connections being such that the timing of the piston-valve can be varied relatively to the timing of the pump-plunger. The piston-valve constitutes a mechanically-actuated valve for regulating the opening and closing, or at least the closing, of the needle-valve 23. The piston-valve is normally kept with its roller 42 pressed against the cam 43 by a spring 46. Into the side of the piston valve chamber there opens a port 47 from the pump-barrel 11, and a port 48 leading to a passage 49 which terminates in a chamber in the body 22 of the fuel-nozzle, in which chamber works the closing piston 26. There is, in addition, a port 50 which is open to the atmosphere. Owing to the disposition of the ports through which piston-valve 40 is lowered the passage 49 is connected through the port 50 to the atmosphere, but when the piston-valve is raised connection to the atmosphere is shut off and the port 47 from the pump-barrel is connected to the port 48 and the passage 49. In the operation of this device the cam 15 is so operatively connected to the internal-combustion engine with which it is to operate that the pump-plunger 12 is reciprocated once for each fuel injection which it is required to produce through the nozzle 21; during the suction or down stroke fuel is drawn in through the passage 18 and the timing of the cam is arranged to be such that the subsequent up stroke occurs at the time when injection is required. This produces a rise of pressure in the passage 19, the piston-valve 40 meanwhile being down so that the port 47 is shut. As soon as the pressure is risen to a sufficient value the pressure acting on the shoulder 25 of the injection valve 23 becomes sufficient to lift the valve against the spring 29 and injection commences. There is a preliminary atomization in the narrow conical space between the needle-valve seating 24 and the nozzle 20, this space being set so as to be of the order of a few thousandths of an inch only. Therefore there will be expansion and atomization into the space 33 before the fuel-nozzle proper is reached. Thereafter there is a further expansion through the nozzle proper 21, and highly atomized fuel enters the combustion chamber of the engine, which may be either an internal-combustion engine of the ordinary type or it may be an internal-engine turbine as described, for example, in my copending application Serial No. 18,957, filed April 29, 1935.

Meanwhile the pump-plunger continues to rise and the injection pressure is kept up but is prevented from rising above a predetermined value by the relief-valve 35 which sets an upper limit to the injection pressure. The spring 29 sets a lower limit and injection must, therefore, take place at a pressure which lies between that set by the spring 29 and that set by the spring 36. If the timing of the cam 43 is delayed sufficiently late the fuel-plunger will come to the end of its stroke and will commence to return. Shortly after the commencement of the return stroke the fuel in the fuel-nozzle will lose its pressure owing to the flowing of the oil back into the working cylinder, and the spring 29 will close the needle-valve again upon its seating 24. Thus the variations of pressure in the pump-barrel determine the opening and closing of the valve without any interposed valve mechanism. Assuming, however, as will be the case except when the maximum injection period possible is being operated, that the cam 43 comes into operation before the end of the delivery stroke of the pump-plunger, then in that case the piston-valve 40 will be raised and oil under pressure will pass through the port 48 and passage 49 to the needle-valve closing piston 26, and as this is of greater area than the shoulder 25 which serves as an opening piston, the needle-valve will be shut, notwithstanding the fact that pressure continues at the seating 24. By arranging the mechanism which interconnects the shaft 16 with the cam 43 so that cam 43 may be adjustable, it will be seen that a variable injection period with a short termination is secured in this way without any complication of the valves between the pump-barrel 11 and the nozzle chamber. Such valves are objectionable as they lead to loss of oil pressure and are difficult to maintain in order.

Referring to Figure 2, this shows the mechanism interconnecting the shaft 16 and the cam 43 together with the variable timing device referred to. The cam 43 is mounted on a shaft 52 which carries a spur wheel 53 meshed with a spur wheel 54 of the same size on a shaft 55 arranged in line with the shaft 16. The shaft 55 is splined to receive a sliding sleeve 56 and the sleeve 56 carries a pin 57. The pin 57 works in an inclined slot 58 in a hollow head 59 in the shaft 16. Therefore the shaft 55 is driven from the shaft 16 through the pin 57 and if the sleeve 56 is moved longitudinally upon the shaft the shaft 55 will be either advanced or retarded relatively to the shaft 16. The sleeve 56 carries a grooved collar 60 in which works a forked lever 61 to effect longitudinal movement and the sleeve is biased towards one end of its movement by a spring 62. This tends to retard as much as possible the cam 43 relatively to the cam 15, but pushing up the sleeve against the spring 62 advances the cam 43 and reduces the injection period.

It will be understood that if desired the shaft 16 can be advanced or retarded for example by driving it through a connection similar to the pin-and-slot connection 57, 58, so as to advance and retard the timing of the beginning of injection.

Referring to Figure 3, this shows a modification of the fuel-pump and injection-nozzle, the barrel 11 and plunger 12, casing 39 and valve 40 being provided and actuated as before. There is a pipe 70 leading to the front end of the injection-nozzle 71 from the pump-barrel and a pipe 80 leading from the valve 40 to a closing piston. Although these pipes are shown in the drawings as quite short it is to be understood that they might be of any desired length and that the same is true of the inter-connections shown in Figure 1.

Between the pump-barrel 11 and the casing 39 there is an inlet-valve 72 connected to an inlet-port 73, which port corresponds to the port 18 in Figure 1.

The body of the injector is in two parts 71 and 74 which are screwed together by a nipple 75 between them and both parts of the body are bored through axially to receive a needle-valve 76 which is pressed upon a seating 77 by a spring 78. The needle-valve carries a cylindrical extension 79 beyond the seating 77 and the extension almost fills a nozzle aperture 89 between which and the plug-like extension there is a narrow annular gap which may be only of the order of one or two thousandths of an inch wide or even less. This gap constitutes the effective nozzle-orifice and the extension 79 and the end of the nozzle are arranged to be flush with one another when the nozzle is shut. The nozzle-orifice widens conically as one proceeds backward from the front face of the nozzle, leaving a definite annular passage 81 around the extension 79, and between it and the seating 77. Behind the seating 77 the needle-valve has a shoulder 85 which corresponds to the shoulder 25 of Figure 1. Around the needle-valve, behind the shoulder 85, there is a sleeve-like relief-valve 82 which presses on a relief-valve seating 83 and is held up to its work by a spring 84. The relief-valve is grooved longitudinally at 86 to provide a passage for carrying away oil should the valve lift and this passage is continued by an internal groove 87 in the nipple 75 to a relief-valve passage 88 connected at 89 to the atmosphere by a transverse bore. The passage 89 to the atmosphere may, if desired, be provided with a nipple for attachment to a drain pipe instead of opening directly to the atmosphere.

The head 90 of the needle-valve 76 serves as a closing piston as well as receiving the pressure of the spring 78. The head 90 is hollowed out to receive the end of a stem 91 co-axial with it, and the stem 91 is pressed normally forward as far as possible in the nozzle casing 74 by a spring 92 held in place by a cap 93. The cap 93 contains also a screw stop 94 corresponding to the stop 31 of Figure 1. This is secured by a lock-nut 95. It will be observed that the oil passage 80 for closing the needle-valve is connected to a space around the spring 78 so that oil pressure admitted through 80 will bear upon the head 90 of the needle-valve to close it. There is a very small gap 96, not amounting to more than one or two thousandths of an inch or even less between the stem 91 and the head 90, and there is another similar gap 97 between the stem 91 and the stop 94. The stem 91 is hollow, containing a central passage-way 98 which communicates with the space 99 around the spring 92, and is thence connected to the atmospheric outlet 89.

The atmospheric outlet 89 is also connected by a branch 101 to the space at the end of the piston-valve 40, and the piston-valve 40 contains two ports 102, 103. One of these serves, when the valve is raised, to connect the pipe 80 with the oil pressure in the pump-barrel 11 and the other port 102 serves, when the valve is lowered to connect the pipe 80 with the branch 101 and thence to atmosphere.

In the operation of this nozzle, as the pump-plunger 12 rises it causes a rise of oil pressure in the pipe 70 which lifts the needle-valve 76 off its seating 77 owing to the action of the pressure on the shoulder 25. The pressure at which this lifting of the needle-valve occurs is determined by the spring 78 and constitutes the initial injection pressure. The amount of the lift is limited by the amount of the gap 96 and is such that preliminary atomization occurs at the seating 77 followed by expansion in the space 81, and further atomization through the fine annular orifice 89. Any further rise in fuel pressure serves to lift the needle-valve somewhat further off its seating, but the total lift is limited by the stem 91 closing the gap 97 and coming against the stop 94. This total lift is made such as not to prevent atomization at the seating 77, but it will be observed that owing to the conical construction of the nozzle-orifice 89 the increase in area at the seating 77 is accompanied by an increase in area of the nozzle-orifice 89 so that the balance of expansion at the seating and the orifice is maintained. If any further rise of injection pressure occurs it may be sufficient to lift the relief-valve 82 and assist the excess fuel to escape through the passages 86, 87 to the atmosphere at 89. Thus the maximum injection pressure is limited as before. Either by the termination of the movement of the plunger 12 or by the operation of the valve 40 the needle-valve is thereafter closed as already described.

As has been hereinbefore explained it is an essential feature of the present invention that the nozzle chamber behind the needle-valve should be in permanent open communication with the source of pressure, but it is not essential that the source of pressure should be peculiar to one nozzle. Figures 4 and 5 show a case where several nozzles are operated from a single source of pressure. The pump is not shown but is connected to the pipe 110. The pipe is connected by a permanently open branch 111 to the front end of the nozzle 112 which is constructed as hereinbefore described with reference to Figure 3. Another branch 113 of the pipe is connected through a mechanically-actuated valve 140 to a closing piston in the nozzle, the pipe 113 corresponding to the pipe 80 of Figure 3 while the pipe 111 corresponds to the pipe 70. The nipple 114 on the body of the nozzle represents a connection to the atmosphere or to a drain pipe, and the internal construction of the nozzle may be assumed to be the same throughout as that of Figure 3. The valve 140 is arranged so that when it is depressed the pipe 113 is connected by a port 115 to the atmosphere at 116 and when it is raised the pipe 113 is connected to the pressure of pipe 110 by means of a port 117. Raising and lowering of the valve 140 is effected by a cam 143 upon a shaft 119, and it will be seen that injection occurs as long as the valve 140 is lowered because the pressure in the branch 111 is then able to lift the needle-valve off its seating, the closing piston being then connected to atmosphere by the pipe 113 and the port 115. The injection is terminated when the edge 120 of the cam 143 lifts the valve 140 just as it was terminated by the lifting of the valve 40 in Figure 3 because this admits pressure from the pipe 110 through 113 to the closing piston within the fuel-nozzle. In order in this case to secure a variation of the injection period the cam 143 is constructed in two parts which are adapted to be rotated relatively to one another to vary the distance between the edge 121 which commences the injection and the edge 120 which terminates it. This mechanism can be understood from Figure 5, where the central parts 142 of two cams are shown having edges 121 for commencing the admission. These cams are mounted upon a driving shaft 122 and they operate to commence admission of fuel at a predetermined point of the time cycle. A helical gear 123 meshing with a pinion 124, and a layshaft 125 is driven from the shaft 122. The layshaft is capable of being moved endwise by means of a collar 126 and a forked lever 127. Owing to the helical gear connection endwise movement of the layshaft will tend to advance or retard it relatively to the driving shaft 122. The layshaft carries helical gears 128, 129, 130 which are of opposite hand from the gear 124 and which mesh with gears 131, 132 and 133 mounted loosely upon the shaft 122. All these gears have an equal number of teeth and, owing to the fact that the pair of gears 128 and 131 are of opposite hand from the gears 123, 124, the longitudinal movement of the layshaft 125 produces an accentuated advance or retard of the gear 131 relatively to the shaft 122 beyond the advance and retard movement produced by the gears 123, 124. The same applies to the gear 132 and the gear 133, all the gears 131, 132, 133 and so on, if others are provided, being advanced or retarded to the same extent simultaneously. Each of the gears carries, so as to abut upon the cams 142, cam sections 143, 144, 145, 146 and so on, and these cam sections carry the closing cam edges 120 hereinbefore referred to. The shaft 122 can be driven through a connection permitting it to be advanced or retarded similarly to shaft 16 as already described.

I claim:—

1. In a fuel injection system for an internal-combustion engine the combination of a fuel-nozzle, a spring-closed needle-valve for the nozzle, an opening-piston and a closing-piston operatively connected to the needle-valve, a pump-barrel, a pump-plunger therein, means for actuating the plunger, a direct connection between the pump-barrel and the nozzle such that the pump-barrel pressure acts also upon the opening-piston, a further connection between the pump-barrel and the closing-piston and a mechanically-actuated valve for opening and closing the connection between the barrel and the closing piston.

2. A fuel injection system as claimed in claim 1, wherein the mechanically-actuated valve is operatively connected to the means for actuating the fuel-plunger by a mechanism which permits of advancing or retarding the time at which it acts to close the fuel-nozzle.

3. A fuel injection system as claimed in claim 1 provided with operative connections for controlling the timing of the mechanically-actuated means for determining when the oil pressure is applied to close the needle-valve, which operative connections comprise a longitudinally slidable member having an obliquely sliding connection with one of the parts which it engages.

4. In liquid fuel admission devices for internal-combustion engines the combination of a fuel-nozzle, a spring-closed admission-valve therefor, an oil-pressure pump for delivering fuel at injection-pressure, piston means for opening the admission-valve, piston means for closing the same and mechanically-actuated means for determining the application of pressure to said piston means, such that the valve is closed by admitting fluid under pressure to act upon said piston closing means while the injection-pressure is still maintained.

5. A liquid fuel admission device as claimed in claim 4 wherein the piston means for opening the admission-valve comprise a shoulder on the valve open to the injection-pressure.

6. A liquid fuel admission device as claimed in claim 4 wherein the means for determining the application of pressure to the piston means comprise a mechanically-actuated valve for determining admission of oil from the pump to the closing piston.

7. A liquid fuel admission device as claimed in claim 4 wherein the needle-valve is opened by the oil pressure applied to the nozzle so that the commencement of injection depends upon the timing of the pump-plunger and its termination on oil pressure applied to a closing-piston under the control of a mechanically-actuated valve.

8. A liquid fuel admission device as claimed in claim 4 wherein a stop is provided to limit the extent of opening of the admission valve and a spring-closed relief valve is provided to limit the maximum injection-pressure.

9. A liquid fuel admsssion device as claimed in claim 4, wherein a constant injection-pressure is maintained in a supply system to each of a number of injectors on a multi-cylinder engine, and a separate control valve for fluid pressure to the valve closing pressure face is provided for each injector so that the valves are closed in their correct timing by admitting fuel under pressure to the valve-closing face.

GEORGE AMERY.